US011928952B1

(12) United States Patent
Dunn et al.

(10) Patent No.: US 11,928,952 B1
(45) Date of Patent: Mar. 12, 2024

(54) SAFETY SYSTEM FOR DROWNING PREVENTION

(71) Applicants: Matthew Tyler Dunn, Knoxville, TN (US); Caitlin Elizabeth Dunn, Knoxville, TN (US)

(72) Inventors: Matthew Tyler Dunn, Knoxville, TN (US); Caitlin Elizabeth Dunn, Knoxville, TN (US)

(*) Notice: Subject to any disclaimer, the term of this patent is extended or adjusted under 35 U.S.C. 154(b) by 318 days.

(21) Appl. No.: 17/487,788

(22) Filed: Sep. 28, 2021

(51) Int. Cl.
*G10L 15/04* (2013.01)
*G08B 7/06* (2006.01)
*G08B 21/02* (2006.01)
*G08B 21/24* (2006.01)
*G10L 15/08* (2006.01)
*G10L 15/22* (2006.01)

(52) U.S. Cl.
CPC .............. *G08B 21/24* (2013.01); *G08B 7/06* (2013.01); *G08B 21/02* (2013.01); *G10L 15/08* (2013.01); *G10L 15/22* (2013.01)

(58) Field of Classification Search
CPC .......... G08B 21/24; G08B 7/06; G08B 21/02; G08B 5/223; G10L 15/08; G10L 15/22; G09B 5/06
USPC ........................................................ 704/251
See application file for complete search history.

(56) References Cited

U.S. PATENT DOCUMENTS

2014/0356820 A1* 12/2014 Hayashi .................. G09B 5/06
434/157

OTHER PUBLICATIONS

Kate Schweitzer, Mom creates Water Guardian Lanyards After Son Drowns, Published—Jul. 17, 2018, Popsugar.com;45056443;United States.
Nicole Hughes; Patent Innovation Sharing Solution, Improving Life; Mother Invents Water Guardian Tags to Help Prevent Child Drowning; Shared by Sara Di Fabio Jan. 28, 2020; The date of this publication is not known, but it is requested that it be considered as prior art for purposes of examination.

* cited by examiner

*Primary Examiner* — Md S Elahee
(74) *Attorney, Agent, or Firm* — Luedeka Neely, P.C.

(57) ABSTRACT

A safety system for supervision of a child involving interaction between a pre-trained first adult conveying responsibility for supervision of the child to a pre-trained second adult. The system utilizes a specific interactive scripted conversation between the first adult and the second adult to assign responsibility for supervision of the child to the second adult. Following this, the first adult transfers a wearable to the second adult to provide a visual and tactile transfer of the responsibility of supervision of the child from the first adult and acceptance of the responsibility of supervision of the child by the second adult corresponding to the interactive conversation between the first adult and the second adult.

5 Claims, 3 Drawing Sheets

SAFETY SYSTEM FOR DROWNING PREVENTION

FIELD

This disclosure relates to the field of child supervision. More particularly, this disclosure relates to a safety system that helps to ensure the presence and vigilance of an adult for improving supervision of children in activities, and in particular, activities such as swimming to help ensure against drowning and near drowning events.

BACKGROUND

A need exists for improving supervision of children in activities, and in particular, activities such as swimming to help avoid incidences of drowning or near drowning. For example, parents or guardians or another adult will commonly watch a child or children swimming in a pool to monitor the child and to be available so that help can be provided quickly in the event a child engages in unsafe activity while swimming, is hurt or begins to struggle or the like while swimming. This is the case in water environments, such as at the beach, a lake or at a pool or the like where no life guard is on duty, and is even the case at water environments where a life guard is on duty. Having a responsible adult present and vigilant to watch over a child swimming is an important safeguard. Remaining vigilant is often difficult, especially when distractions arise, such as a phone call, or other diversion to the attention of the adult occurs.

Adults can become distracted while not meaning to. For example, receiving a phone call, or checking email or social media on a cellular phone can distract the adult from being vigilant. Also, often times several adults will be present. In such circumstances, no single adult has any structured responsibility and distractions can easily occur and assumptions can be made that can result in a gap in vigilance. For example, if two or more adults are standing around the pool, each might assume that the other is paying close attention to a swimmer within the pool. One might receive a phone call, check social media, or leave the pool area or otherwise become unvigilant and unaware of the status of a swimmer. Also, the adults may become engaged in conversation and lose vigilance. Others may similarly be distracted and it may inadvertently occur that no one is monitoring the pool with any vigilance. Further, the child or other children may come and go from the pool, which can further complicate matters. For example, if a child leaves the pool the adult may then let down their guard and not notice that the child has re-entered the pool.

The present disclosure advantageously provides a safety system that helps to ensure the presence and vigilance of an adult for improving supervision of children in activities, and in particular, activities such as swimming to help ensure against drowning and near drowning events.

SUMMARY

The above and other needs are met by a safety system that helps to ensure the presence and vigilance of an adult for improving supervision of children in activities, and in particular, activities such as swimming to help ensure against drowning and near drowning events.

In one aspect, the disclosure provides a safety system for supervision of a child involving interaction between a pre-trained first adult conveying responsibility for supervision of the child to a pre-trained second adult. The system includes an interactive scripted conversation between the first adult and the second adult. The scripted conversation includes a first statement by the first adult to the second adult having a first prefix statement identifying the first adult and a first suffix statement identifying the entirety of responsibility of supervision of the child being passed to the second adult; a second statement by the second adult to the first adult having a second prefix statement identifying the second adult and a second suffix statement identifying the entirety of the responsibility of supervision of the child being accepted by the second adult; and a third statement by the first adult to the second adult having a third prefix statement identifying the first adult and a third suffix statement identifying the entirety of the responsibility of supervision of the child accepted by the second adult.

Following the scripted conversation, an interactive transfer of a wearable by the first adult to the second adult takes place to provide a visual and tactile transfer of the responsibility of supervision of the child from the first adult and acceptance of the responsibility of supervision of the child by the second adult corresponding to the interactive conversation between the first adult and the second adult. The wearable is configured to serve as a tactile and visual reminder to the second adult of the responsibility of supervision of the child accepted by the second adult.

In another aspect, the disclosure provides a method for supervising a child in which a pre-trained first adult conveys responsibility for supervision of the child to a pre-trained second adult. The method includes the steps of providing training to the first adult and the second adult for conveying and accepting responsibility for supervision of the child. In accomplishing the method, the first adult and the second adult are located at a location where the child is to be supervised, and the first adult and the second adult initially engage in an interactive scripted conversation.

The scripted conversation includes a first statement by the first adult to the second adult having a first prefix statement identifying the first adult and a first suffix statement identifying the entirety of responsibility of supervision of the child being passed to the second adult; a second statement by the second adult to the first adult having a second prefix statement identifying the second adult and a second suffix statement identifying the entirety of the responsibility of supervision of the child being accepted by the second adult; and a third statement by the first adult to the second adult having a third prefix statement identifying the first adult and a third suffix statement identifying the entirety of the responsibility of supervision of the child accepted by the second adult.

The first adult and the second adult engage in an interactive transfer of a wearable by the first adult to the second adult immediately following the scripted conversation to provide a visual and tactile transfer of the responsibility of supervision of the child from the first adult and acceptance of the responsibility of supervision of the child by the second adult corresponding to the interactive conversation between the first adult and the second adult. The wearable is configured to serve as a tactile and visual reminder to the second adult of the responsibility of supervision of the child accepted by the second adult.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

With reference to the drawings, there is shown a safety system and associated method according to the disclosure for improving supervision of children in activities, and in particular, activities such as swimming. For simplicity, the system is depicted showing utilization of the system by two adults (adult A1 and adult A2) and a single child C at a water environment such as a beach, lake, or pool P.

While described herein in the context of use at the pool P, it will be understood that the pool P represents any such water environment or other non-water environment where children may swim or engage in recreational activities and it is desired that they be supervised by an adult.

As described, the system is configured to provide verbal, visual and tactile confirmation of exchange of responsibility from adult A1 to adult A2 for supervision of child C at the pool P.

The system is also configured to continue to reinforce and remind adult 2 of their supervisory responsibilities for the duration of their watch over the child C.

Figure 1:
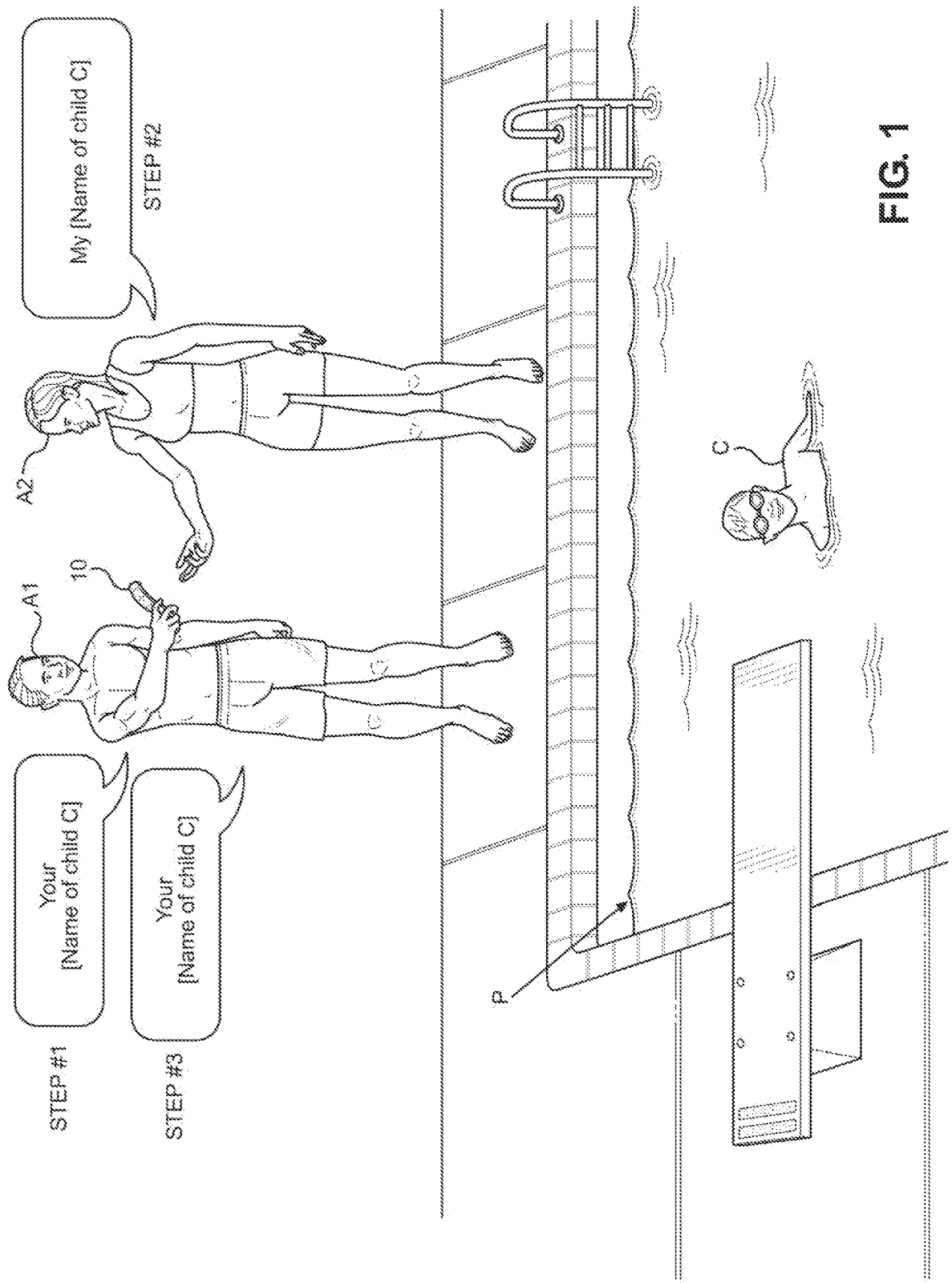
FIG. 1 depicts steps in a safety system according to the disclosure in which verbal commands are stated to initiate transition of supervisory role from one adult to another.

As described herein, and with reference to FIG. 1, the system and its application begins with Step 1, in which a verbal command is given, followed by confirmatory verbal commands as shown in Step 2 and Step 3. The verbal commands of Steps 1-3 according to the disclosure are structured to clearly and unambiguously assign and define the responsibility of supervision that is being assigned. In the drawings, the responsibility is being assigned from adult 1 to adult 2. This may be at the beginning when the child C first arrives at the pool P or at any time during the time period that the child C is at the pool P.

For example, as shown in FIG. 1, adult 1 has supervisory responsibility of the child C and as shown adult 1 and adult 2 are initially engaged in Steps 1-3 which provide a verbal exchange to clearly and unambiguously assign or transfer this responsibility from adult 1 to adult 2.

As shown, in Step 1, adult 1 states: "Your [Name of child C]" to adult 2. In Step 2 adult 2 responds: "My [Name of child C]" back to adult 1. In Step 3 adult 1 replies: "Your [Name of child C]" back to adult 2. So, if the name of the child C is Bryson, adult 1 would say "Your Bryson", adult 2 would respond "My Bryson", and adult 1 would reply back to adult 2 "Your Bryson".

If there is more than one child C for the responsible adult to supervise, then the names of such children would be utilized. For example, in Step 1, adult 1 states: "Your [Names of children]". In Step 2 adult 2 responds: "My [Names of children]". In Step 3 adult 1 replies: "Your [Names of children]". So, if the names of the children are Bryson, Suzy and Tom, adult 1 would say "Your Bryson, Suzy and Tom", adult 2 would respond "My Bryson, Suzy and Tom", and adult 1 would reply back to adult 2 "Your Bryson, Suzy and Tom".

As will be appreciated, the sequence of verbal commands is intentional and focused on positive transition and acceptance of responsibility. To elaborate, this sequence of verbal commands is directionally personal to the adults 1 and 2 and the child C.

For example, the command of Step 1 begins with adult 1 saying to adult 2: "Your". This is a focused command to adult 2 that adult 2 is to have responsibility. It is a short-hand way of saying "You have responsibility" or the like. This prefix of the command is personal to and identifies the speaker and is immediately followed by the entirety of the specific responsibility adult 2 is accepting: "Name of child" or "Names of children". This statement identifies without ambiguity the identity of all of the children that are to be watched. Thus, Step 1 begins with a statement identifying the speaker, adult 1, followed by a statement identifying the entirety of the specific responsibility of supervision of the child being passed to adult 2.

A statement such as "You've got 'em" is too vague and ambiguous. For example, if there are several children to be supervised it is beneficial to consciously identify each and every child in the command. Otherwise, if it is vague or ambiguous, the supervising adult might have less vigilance. For example, if there are 7 children in the pool and the adult is supervising three of them, but children are constantly getting out of the pool or entering the pool, being unfocused on the front end may deter from the vigilance of the specific children the adult is to supervise. Of course, a responsible adult will be alert for any unsafe conditions, the adult needs to be specifically focused on the specifically identified children.

The command of Step 2 is similarly focused and begins with "My." Thus, adult 2 is accepting the responsibility. The statement "My" is personal to the speaker, namely adult 2. Likewise, this is followed by specificity of the children to be watched. Thus, Step 2 begins with a statement identifying the speaker, adult 2, followed by a statement identifying the entirety of the specific responsibility of supervision being accepted by adult 2.

Finally, in Step 3, the completion of the transfer of the responsibility occurs by adult 1 repeating the command of Step 1 in confirmation and with specificity. Thus, Step 3 begins with a statement identifying the speaker, adult 1, followed by a statement confirming the entirety of the specific responsibility of supervision that is now passed to adult 2.

As noted, Step 1 is the same as Step 3. However, Step 1 is an initial request or question to adult 2. In the event adult 2 is not able or ready or desiring to accept the responsibility, adult 2 could decline and not proceed to respond as set forth in Step 2. But, if adult 2 does respond in the manner of Step 2, then Step 3 completes the conversation and confirms that responsibility has now passed to adult 2. That is, even though Step 3 has the same verbiage as Step 1, the context in Step 3 is not the same as in Step 1, but is a confirmatory response to the statement of Step 2 and serves to complete the transfer of responsibility.

Figure 2:
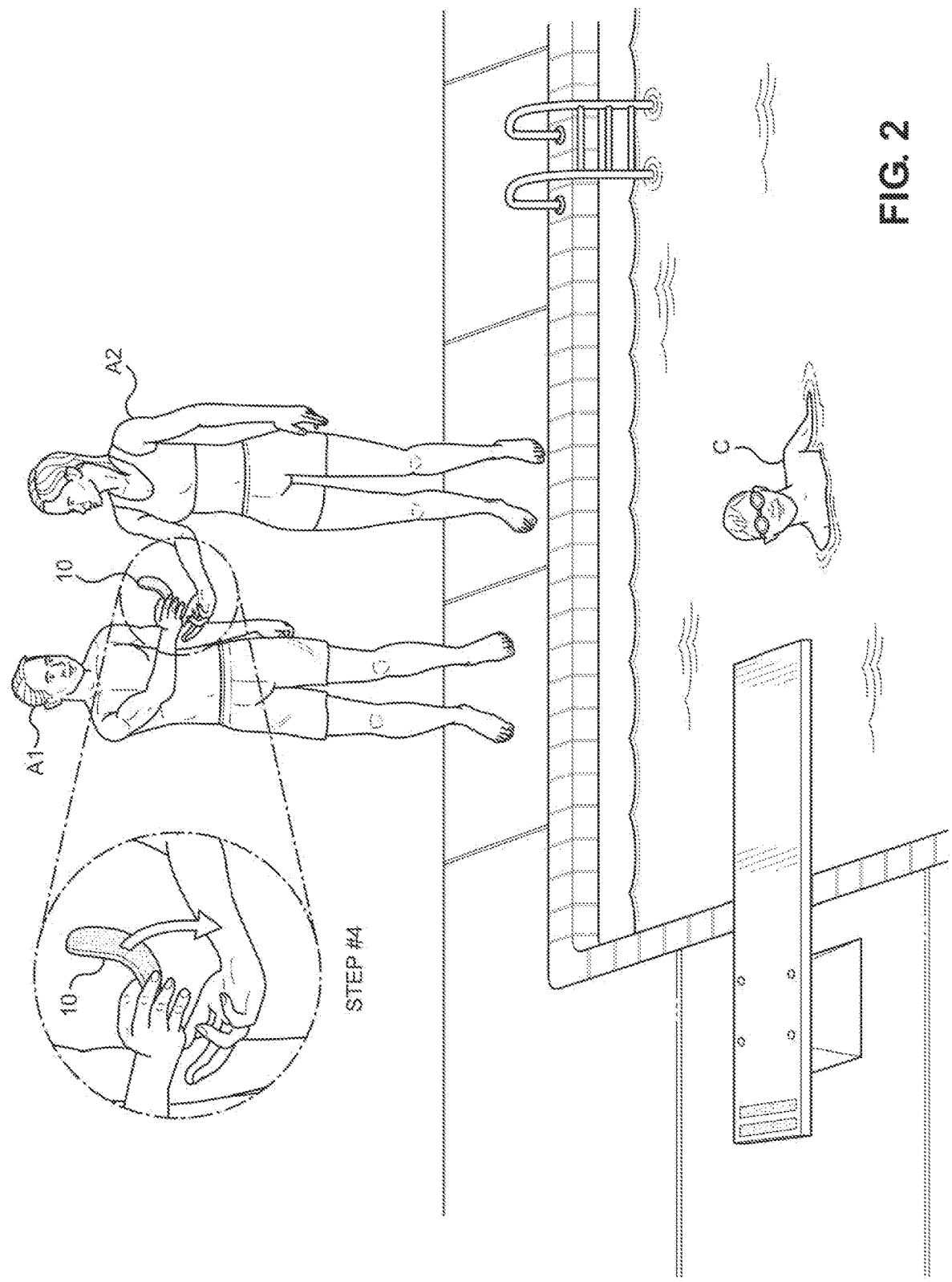
FIG. 2 depicts a step in the system in which a wearable device is installed on the supervising adult.

Another important aspect of the system is the incorporation of a visual and tactile wearable 10 following the verbal commands of Steps 1-3. Following the verbal exchange of Steps 1-3, and as shown in FIG. 2, in Step 4, the person giving up or transferring responsibility (adult 1) applies the wearable 10 to the person receiving responsibility (adult 2). This provides a visual and tactile transfer and acceptance of responsibility from the adult 1 to the adult 2.

Figure 3:
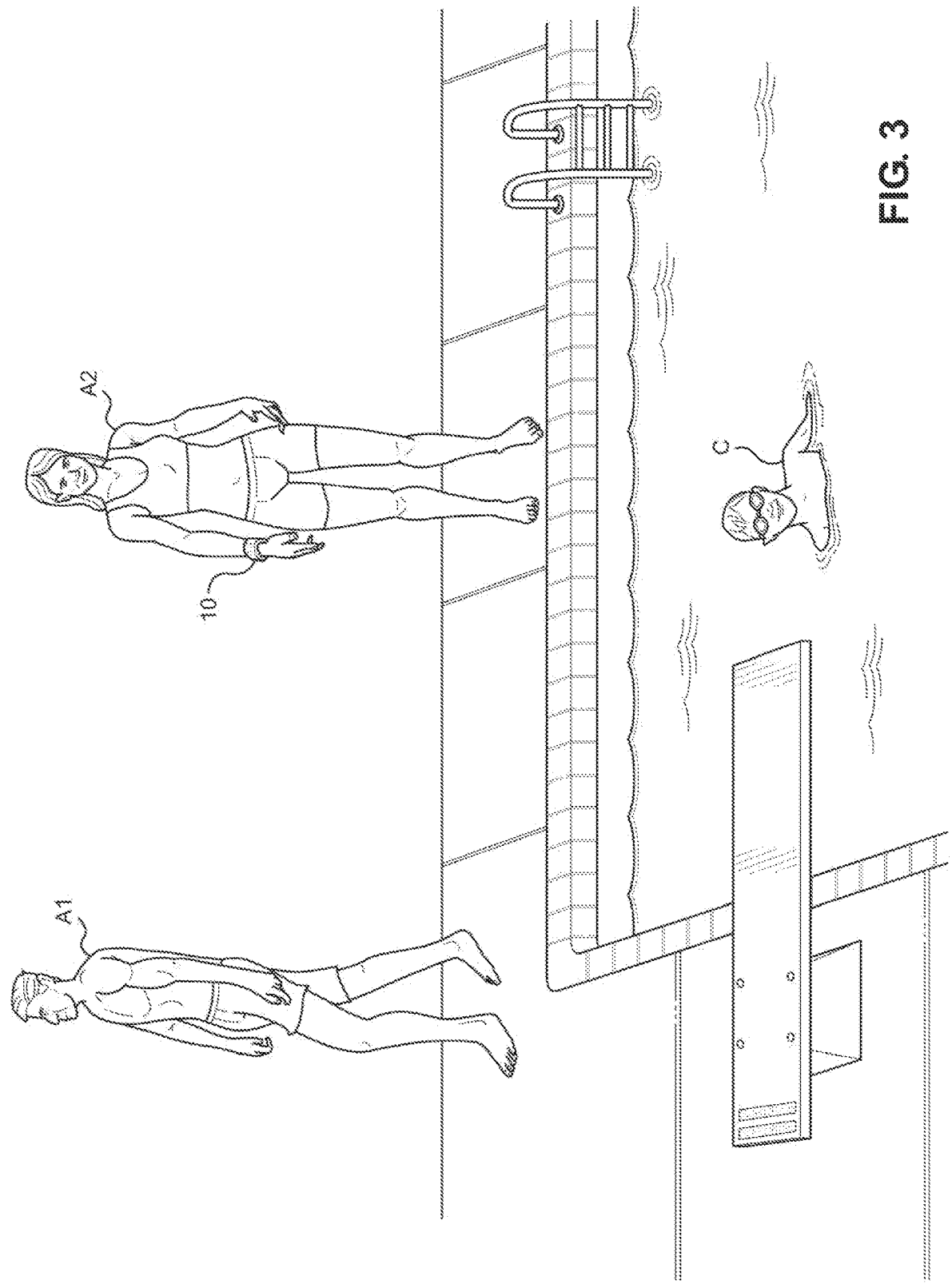
FIG. 3 depicts the completion of the transition of supervisory role from one adult to another.

Application and acceptance of the wearable 10 by the adult 2 completes the transfer of responsibility and as depicted in FIG. 3, adult 1 is free to leave and adult 2 stays and supervises child C. The duration of the supervision of the child C by adult 2 remains until such time as they are relieved in the same manner using the system with another adult, or they leave the pool P with the child. For example, if adult 2 is a parent or guardian of the child C and they leave the pool P together and go home. Responsibility may be transferred to another adult by repeating this same sequence of events.

The wearable 10 as shown is a slap bracelet or wrist band or other wearable article that may easily be applied by one person to another and remains exposed on a limb of the wearer so as to remain visible to the wearer. Use of the slap bracelet is desired because the physical act of slapping the bracelet onto the wrist of the user provides an abrupt tactile event that emphasizes both the gravity of the accepted responsibility and the receipt of the wearable 10. The wearable 10 is desirably made of a medical grade silicone that is waterproof and avoids skin irritation.

The wearable 10 is preferably provided in a bright and eye-catching color, such as safety orange or red or the like, to serve as a visual reminder beyond just its presence on the wearer. The wearable may also include electronics to provide a periodic vibration or the like as a further tactile reminder.

Accordingly, as described and depicted, the present disclosure advantageously provides a safety system that helps to ensure the presence and vigilance of an adult for improving supervision of children in activities, and in particular, activities such as swimming to help ensure against drowning and near drowning events.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A safety system for supervision of a child involving interaction between a pre-trained first adult conveying responsibility for supervision of the child to a pre-trained second adult, the system comprising:
   an interactive scripted conversation between the first adult and the second adult comprising a first statement by the first adult to the second adult comprising a first prefix statement identifying the first adult and a first suffix statement identifying an entirety of responsibility of supervision of the child being passed to the second adult; a second statement by the second adult to the first adult comprising a second prefix statement identifying the second adult and a second suffix statement identifying the entirety of the responsibility of supervision of the child being accepted by the second adult; and a third statement by the first adult to the second adult comprising a third prefix statement identifying the first adult and a third suffix statement identifying the entirety of the responsibility of supervision of the child accepted by the second adult; and
   an interactive transfer of a wearable by the first adult to the second adult to provide a visual and tactile transfer of the responsibility of supervision of the child from the first adult and acceptance of the responsibility of supervision of the child by the second adult corresponding to the interactive conversation between the first adult and the second adult, the wearable being configured to serve as a tactile and visual reminder to the second adult of the responsibility of supervision of the child accepted by the second adult.

2. The system of claim 1, wherein the first statement and the third statement are identical.

3. The system of claim 1, wherein the wearable comprises a wrist bracelet.

4. The system of claim 1, wherein the safety system is configured for supervision of the child at a water environment.

5. A method for supervising a child in which a pre-trained first adult conveys responsibility for supervision of the child to a pre-trained second adult, the method comprising the steps of:
   providing training to the first adult and the second adult for conveying and accepting responsibility for supervision of the child;
   locating the first adult and the second adult at a location where the child is to be supervised and having the first adult and the second adult engage in an interactive scripted conversation between the first adult and the second adult, the scripted conversation comprising a first statement by the first adult to the second adult comprising a first prefix statement identifying the first adult and a first suffix statement identifying an entirety of responsibility of supervision of the child being passed to the second adult; a second statement by the second adult to the first adult comprising a second prefix statement identifying the second adult and a second suffix statement identifying the entirety of the responsibility of supervision of the child being accepted by the second adult; and a third statement by the first adult to the second adult comprising a third prefix statement identifying the first adult and a third suffix statement identifying the entirety of the responsibility of supervision of the child accepted by the second adult; and
   having the first adult and the second adult engage in an interactive transfer of a wearable by the first adult to the second adult immediately following the scripted conversation to provide a visual and tactile transfer of the responsibility of supervision of the child from the first adult and acceptance of the responsibility of supervision of the child by the second adult corresponding to the interactive conversation between the first adult and the second adult, the wearable being configured to serve as a tactile and visual reminder to the second adult of the responsibility of supervision of the child accepted by the second adult.

* * * * *